(12) United States Patent
Whitton et al.

(10) Patent No.: US 7,212,898 B2
(45) Date of Patent: May 1, 2007

(54) METHOD AND APPARATUS FOR ADAPTIVE CONTROL OF POWER-ON SKIP THROUGH NEUTRAL DOWNSHIFTS

(75) Inventors: Matthew D. Whitton, Howell, MI (US); Robert L. Williams, Holly, MI (US)

(73) Assignee: General Motors Corporation, Detroit, MI (US)

( * ) Notice: Subject to any disclaimer, the term of this patent is extended or adjusted under 35 U.S.C. 154(b) by 250 days.

(21) Appl. No.: 11/054,679

(22) Filed: Feb. 9, 2005

(65) Prior Publication Data

US 2006/0178244 A1    Aug. 10, 2006

(51) Int. Cl.
*F16H 61/26*    (2006.01)
*B60K 23/00*    (2006.01)

(52) U.S. Cl. .............................. 701/51; 701/60; 74/335
(58) Field of Classification Search .................. 701/51, 701/60, 64, 66, 67; 475/125, 128, 118, 120; 74/335, 337
See application file for complete search history.

(56) References Cited

U.S. PATENT DOCUMENTS 4,653,350 A * 3/1987 Downs et al. ................ 701/58
6,278,926 B1 * 8/2001 Jain et al. ..................... 701/58
6,428,440 B2 * 8/2002 Yuasa et al. ................. 475/125
6,961,646 B2 * 11/2005 Soliman et al. ............... 701/51

* cited by examiner

*Primary Examiner*—Dalena Tran
(74) *Attorney, Agent, or Firm*—Christopher DeVries

(57) ABSTRACT

The present invention provides a method and apparatus for mathematically calculating an optimal transmission input torque value for the inertia phase and the torque phase of a ratio change. Engine output is then altered by an amount necessary to change the actual value of the transmission input torque to the calculated optimal value of transmission input torque. The timing of the clutch elements during the power-on skip through neutral downshift is established by calculating delay periods for the off-going and on-coming clutches such that a predetermined desired shift time is met. The power-on skip through neutral downshift is thereafter adaptively controlled so that aberrations are diagnosed and corrected during subsequent downshifts. The invention is carried out by monitoring engine and/or transmission characteristics including input speed, output speed and shift duration during a downshift and identifying departures from acceptable patterns. Each type of departure calls for a particular remedy, and a suitable adjustment is calculated thereafter implemented by changing one or more initial conditions for the next shift of the same type.

25 Claims, 5 Drawing Sheets

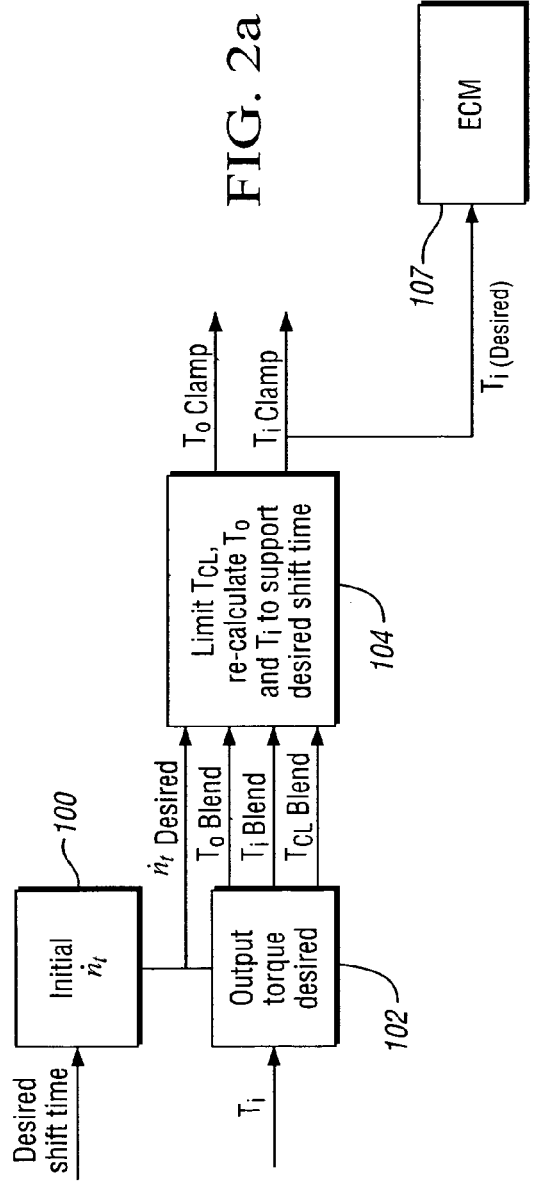
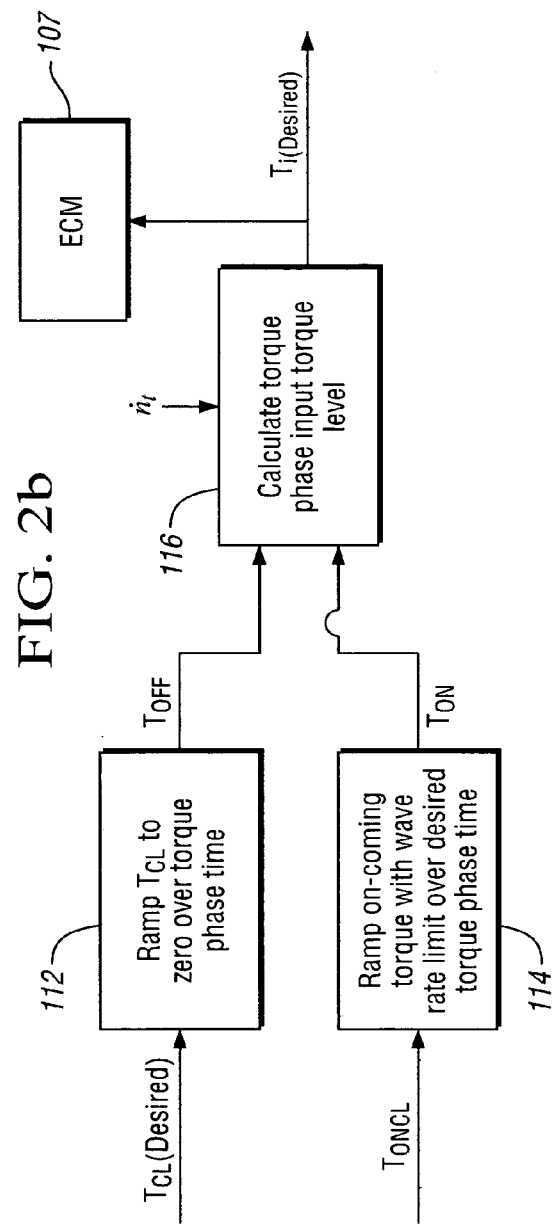

US 7,212,898 B2

METHOD AND APPARATUS FOR ADAPTIVE CONTROL OF POWER-ON SKIP THROUGH NEUTRAL DOWNSHIFTS

TECHNICAL FIELD

The present invention relates to a method and apparatus for improving power-on downshifts that skip through neutral in an automatic transmission.

BACKGROUND OF THE INVENTION

Generally, a motor vehicle automatic transmission includes a number of gear elements coupling its input and output shafts, and a related number of torque establishing devices such as clutches and brakes that are selectively engageable to activate certain gear elements for establishing a desired speed ratio between the input and output shafts. As used herein, the terms "clutches" and "torque transmitting devices" will be used to refer to brakes as well as clutches.

The transmission input shaft is connected to the vehicle engine through a fluid coupling such as a torque converter, and the output shaft is connected directly to the vehicle wheels. Shifting from one forward speed ratio to another is performed in response to engine throttle and vehicle speed, and generally involves releasing or disengaging one or more clutches (off-going) associated with the current speed ratio and engaging one or more clutches (on-coming) associated with the desired speed ratio. Downshifts that skip through neutral include those wherein two off-going clutches associated with the current speed ratio are released and two on-coming clutches associated with the desired speed ratio are engaged during the ratio change such as, for example, a sixth gear to third gear ratio change or a fifth gear to second gear ratio change.

The speed ratio is defined as the transmission input speed or turbine speed divided by the output speed. Thus, a low gear range has a high speed ratio and a higher gear range has a lower speed ratio. To perform a downshift, a shift is made from a low speed ratio to a high speed ratio. In the type of transmission involved in this invention, the downshift is accomplished by disengaging two clutches associated with the lower speed ratio and engaging two clutches associated with the higher speed ratio, to thereby reconfigure the gear set to operate at the higher speed ratio. Shifts performed in the above manner require precise timing in order to achieve high quality shifting.

The quality of shift depends on the cooperative operation of several functions, such as pressure changes within oncoming and off-going clutch apply chambers and the timing of control events. Moreover, manufacturing tolerances in each transmission, changes due to wear, variations in oil quality and temperature, etc., lead to shift quality degradation.

SUMMARY OF THE INVENTION

The invention provides a method and apparatus for calculating optimal values for transmission input torque during the inertia phase and the torque phase of the ratio change, and thereafter adaptively controlling a power-on downshift that skips through neutral in an automatic transmission wherein a transmission aberration during a shift is diagnosed and corrected during subsequent downshifts.

The method of the invention is carried out by mathematically calculating optimal values for transmission input torque during the inertia phase and the torque phase of the ratio change. Additionally, the method of the invention calculates when to release the two off-going clutches, as well as when and how quickly to engage the two on-coming clutches to optimize the power-on skip through neutral downshift.

The method of the invention also monitors transmission characteristics including input speed, output speed, and shift duration during a power-on downshift, and identifies departures from acceptable patterns. Each type of departure calls for a particular remedy, and a suitable adjustment is calculated and applied by changing certain parameters in the shift control to alter one or more conditions for the next shift of the same type. The adjustments may have to be large to make a full or significant partial correction at the next shift. Conversely, small increments may be necessary to avoid over-correction.

The above objects, features and advantages, and other objects, features and advantages of the present invention are readily apparent from the following detailed description of the best mode for carrying out the invention when taken in connection with the accompanying drawings.

BRIEF DESCRIPTION OF THE DRAWINGS

FIG. 2a is a block diagram illustrating a method for calculating desired transmission input torque during the inertia phase of a ratio change;

FIG. 2b is a block diagram illustrating a method for calculating desired transmission input torque during the torque phase of a ratio change;

DESCRIPTION OF THE PREFERRED EMBODIMENT

The method and apparatus for improving power-on downshifts that skip through neutral in an automatic transmission may be implemented with the pending patent application entitled "METHOD AND APPARATUS FOR ADAPTIVE CONTROL OF POWER-ON DOWNSHIFTS IN AN AUTOMATIC TRANSMISSION", filed Oct. 22, 2004, to Matthew Whitton, Ser. No. 10/972,067, which is hereby incorporated by reference in its entirety.

Power-on downshifts include downshifts that take place while engine torque is positive. Downshifts that skip through neutral include those wherein two off-going clutches associated with the current speed ratio are released and two on-coming clutches associated with the desired speed ratio are engaged during the ratio change such as, for example, a sixth gear to third gear ratio change (6-3 ratio change) or a fifth gear to second gear ratio change (5-2 ratio change).

It should also be appreciated that the present invention may apply to any other ratio change by inducing a skip through neutral condition. A skip through neutral condition may be induced by releasing a common clutch element during the ratio change and thereafter re-engaging the common clutch. A common clutch is defined for purposes of the present invention as a clutch common to both the attained gear and the commanded gear. For example, during a 6-2 ratio change, the clutch C4 is common to both sixth gear and second gear, and remains engaged during a downshift that does not skip through neutral. A skip through neutral condition may, however, be induced during the 6-2 downshift by releasing the C4 clutch along with the other off-going clutch (C2 clutch) and thereafter engaging the C4 clutch and the other on-coming clutch (C1 clutch) in a manner described in detail hereinafter.

The control of this invention is described in the context of a multi-ratio power transmission having a planetary gear set of the type described in the U.S. Pat. No. 4,070,927 to Polak, and having an electro-hydraulic control of the type described in U.S. Pat. No. 5,601,506 to Long et al, both of which are hereby incorporated by reference in their entireties. Accordingly, the gear set and control elements shown in FIG. 1 hereof have been greatly simplified, it being understood that further information regarding the fluid pressure routings and so on may be found in the aforementioned patents.

Figure 1:
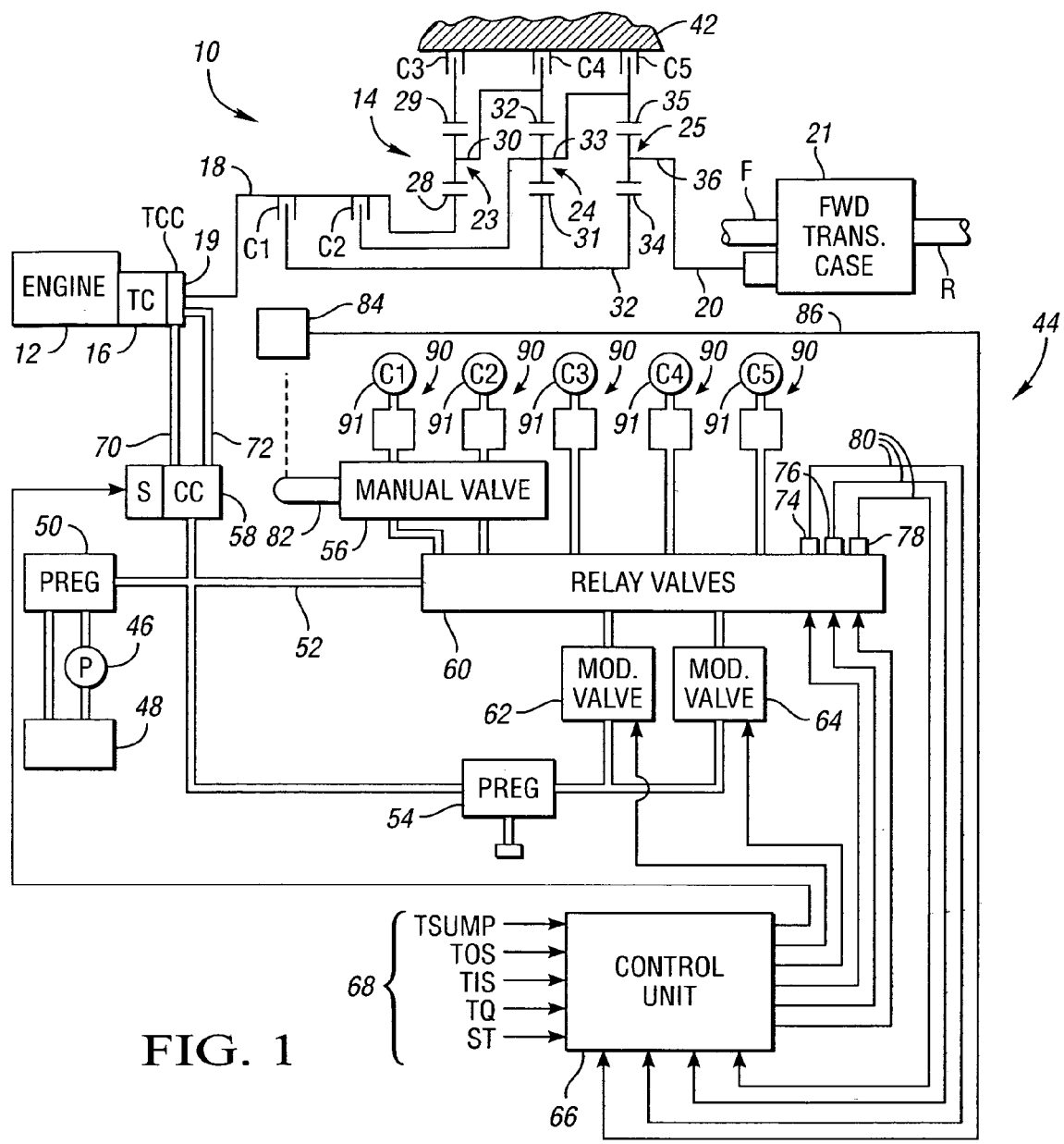
FIG. 1 is a schematic illustration of an automatic transmission.

Referring to FIG. 1, the reference numeral 10 generally designates a vehicle power train including engine 12, transmission 14, and a torque converter 16 providing a fluid coupling between engine 12 and transmission input shaft 18. It should be appreciated that while the invention will be described as being used with a conventional engine 12, alternate power sources such as an electric motor or hybrid electric/gas motor may be implemented as well.

A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gear sets, designated generally by the reference numerals 23, 24 and 25. The planetary gear set 23 includes a sun gear member 28, a ring gear member 29, and a planet carrier assembly 30. The planet carrier assembly 30 includes a plurality of pinion gears rotatably mounted on a carrier member and disposed in meshing relationship with both the sun gear member 28 and the ring gear member 29. The planetary gear set 24 includes a sun gear member 31, a ring gear member 32, and a planet carrier assembly 33. The planet carrier assembly 33 includes a plurality of pinion gears rotatably mounted on a carrier member and disposed in meshing relationship with both the sun gear member 31 and the ring gear member 32. The planetary gear set 25 includes a sun gear member 34, a ring gear member 35, and a planet carrier assembly 36. The planet carrier assembly 36 includes a plurality of pinion gears rotatably mounted on a carrier member and disposed in meshing relationship with both the sun gear member 34 and the ring gear member 35.

The input shaft 18 continuously drives the sun gear 28 of gear set 23, selectively drives the sun gears 31, 34 of gear sets 24, 25 via clutch C1, and selectively drives the carrier 33 of gear set 24 via clutch C2. The ring gears 29, 32, 35 of gear sets 23, 24, 25 are selectively connected to ground 42 via clutches (i.e., brakes) C3, C4 and C5, respectively.

The state of the clutches C1–C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Skip through neutral downshifting from one forward speed ratio to another is achieved by disengaging two clutches (referred to as the off-going clutches) associated with the current speed ratio while engaging two other clutches (referred to as the on-coming clutches) associated with the desired speed ratio. For example, the transmission 14 is downshifted from sixth gear to third gear by disengaging clutches C2 and C4, and engaging clutches C1 and C3.

The torque converter clutch 19 and the transmission clutches C1–C5 are controlled by an electro-hydraulic control system, generally designated by reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle, and a number of solenoid-operated fluid control valves 58, 60, 62 and 64.

The electronic portion of the electro-hydraulic control system 44 is primarily embodied in the transmission control unit 66, or controller, which is microprocessor-based and conventional in architecture. The transmission control unit 66 controls the solenoid-operated fluid control valves 58–64 based on a number of inputs 68 to achieve a desired transmission speed ratio. Such inputs include, for example, signals representing the transmission input speed TIS, a driver torque command TQ, the transmission output speed TOS, and the hydraulic fluid temperature Tsump. Sensors for developing such signals may be conventional in nature, and have been omitted for simplicity.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid-operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, fluid control valves 60 are a set of three on/off relay valves, shown in FIG. 1 as a consolidated block, and are utilized in concert with manual valve 56 to enable controlled engagement and disengagement of each of the clutches C1–C5. Valves 62, 64 are of the modulated type. For any selected ratio, the control unit 66 activates a particular combination of relay valves 60 for coupling one of the modulated valves 62, 64 to the on-coming clutch, and the other one of the modulated valves 62, 64 to the off-going clutch.

The modulated valves 62, 64 each comprise a conventional pressure regulator valve biased by a variable pilot pressure that is developed by current controlled force motors (not shown). Fluid control valve 58 is also a modulated valve, and controls the fluid supply path to converter clutch 19 in lines 70, 72 for selectively engaging and disengaging the converter clutch 19. The transmission control unit 66 determines pressure commands for smoothly engaging the on-coming clutches while smoothly disengaging the off-going clutches to shift from one speed ratio to another, develops corresponding force motor current commands, and then supplies current to the respective force motors in accordance with the current commands. Thus, the clutches C1–C5 are responsive to the pressure commands via the valves 58–64 and their respective actuating elements (e.g., solenoids, current-controlled force motors).

As indicated above, each shift from one speed ratio to another includes a fill or preparation phase during which apply chambers (i.e. apply chamber 91) of the on-coming clutches are filled in preparation for torque transmission. Fluid supplied to the apply chambers compresses an internal return spring (not shown), thereby stroking a piston (not shown). Once the apply chambers are filled, the pistons apply a force to the clutch plates, developing torque capacity beyond the initial return spring pressure. Thereafter, the clutches transmit torque in relation to the clutch pressure, and the shift can be completed using various control strategies. The usual control strategy involves commanding a maximum on-coming clutch pressure for an empirically determined fill time, and then proceeding with the subsequent phases of the shift. The volume of fluid required to fill an apply chamber and thereby cause the clutch to gain torque capacity is referred to as the "clutch volume."

The controller 66 determines the timing of the pressure commands based on an estimated volume for each on-coming clutch, i.e., an estimated volume of fluid required to fill each on-coming clutch apply chamber and thereby cause the on-coming clutches to gain torque capacity. Estimated on-coming clutch volumes must be used because the actual on-coming clutch volumes may vary over time as a result of wear, and may vary from transmission to transmission because of build variations and tolerances.

The controller 66 calculates an estimated volume of fluid supplied to each of the on-coming clutch apply chambers as the chambers are being filled based on a mathematical model of the transmission hydraulic system, and compares the estimated volume of fluid supplied to the estimated clutch volume. When the estimated volume of fluid supplied to one of the apply chambers equals the estimated clutch volume, then the respective on-coming clutch should gain capacity. A hydraulic flow model for use in estimating the volume of fluid supplied to an apply chamber is described in U.S. Pat. No. 6,285,942, issued Sep. 4, 2001 to Steinmetz et al, which is hereby incorporated by reference in its entirety. The model inputs include the fill pressure, the shift type ST (for example, a 2-1 downshift), the speed of pump 46, and the temperature Tsump of the hydraulic fluid. The output of the model is the on-coming clutch flow rate. The flow rate is integrated by an integrator to form the estimated cumulative volume of fluid supplied to the apply chamber. In a preferred embodiment, the controller 66 subtracts the estimated volume of fluid supplied from the estimated clutch volume to determine an estimated clutch volume remaining. If the controller is accurate, the estimated clutch volume remaining will be zero at the time the on-coming clutch gains torque capacity.

Figure 1A:
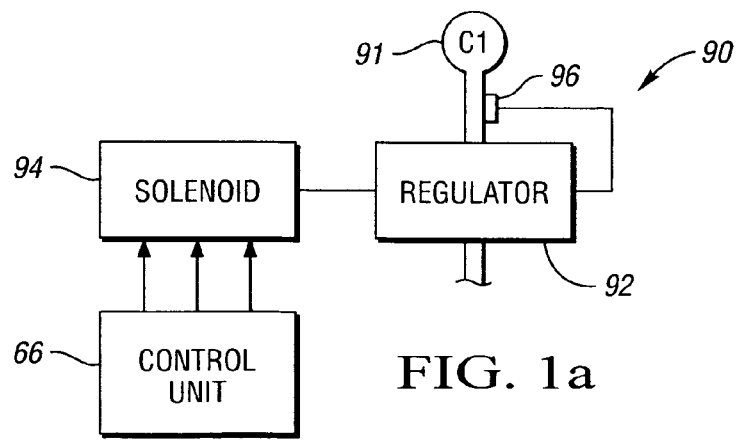
FIG. 1a is a schematic illustration of a valve of FIG. 1.

Alternatively, instead of modulated valves 62, 64 and relay valves 60, the transmission may include a plurality of individual control valves each operatively connected to a respective apply chamber 91. Referring to FIG. 1A, an exemplary fluid control valve 90 includes a regulator 92, a solenoid 94 and a pressure sensor 96. Each control valve 90 is configured to provide fluid to the apply chamber 91 of its respective clutch C1–C5 at either a full feed state or a regulating state.

As shown in FIG. 2a, a method of the present invention calculates an optimal transmission input torque during the inertia phase of a power-on skip through neutral downshift. A power-on skip through neutral downshift is a subset of the more general power-on downshift. Accordingly, the method of the present invention initially derives a series of equations drawn to the more general power-on downshift disclosed in the incorporated patent application Ser. No. 10/972,067. The derived equations are thereafter solved using assumptions specifically applying to the inertia phase of power-on downshifts that skip through neutral. Such assumptions include that during the inertia phase of a power-on skip through neutral downshift the transmission output torque is zero and the torque applied by both off-going clutches is zero.

For purposes of this disclosure the derivative of a reference character is represented by the reference character with a dot thereabove as is well known in the field of mathematics. For example, the reference character nt represents turbine speed and the reference character $\dot{n}_t$ represents the first derivative of turbine speed which is also known as turbine acceleration.

At step 100 of FIG. 2a, the desired shift time is applied to establish a desired turbine acceleration profile as will be described in detail hereinafter. The desired shift time is a predefined time period selected to provide optimal shift feel and, as best shown in FIG. 3b, is the time between the point at which the torque converter turbine speed $n_{t1}$ first leaves the attained gear speed Ag and the point at which the torque converter turbine speed $n_{t1}$ reaches the commanded gear speed Cg (also known as the point of synchronization). The following steps 102–104 will initially be described without applying the assumptions for power-on skip through neutral downshifts to explain the derivation of the equations, and thereafter the resultant equations will be solved using these assumptions. At step 102, the desired turbine acceleration $\dot{n}_t$ and the current transmission input torque Ti are used to calculate the corresponding desired output torque To_Blend, and the output torque is modified by a scalar to the value of the desired output torque. The scalar is a calibration allowing for different combinations of clutch torque and input torque during the inertia phase such that shift time is maintained. In other words the scalar may be calibrated to provide either a firm shift or a more gentle shift during the same shift time. After output torque has been modified, a corresponding clutch torque Tcl_Blend is calculated. At step 104, clutch torque is limited and this limited torque value is used to recalculate input torque Ti_Clamp and output torque To_Clamp such that shift time is maintained. Also at step 104, the recalculated input torque Ti_Clamp is adjusted by a multiplication factor representative of the torque converter and sent to the engine control module 107.

Figure 3A:
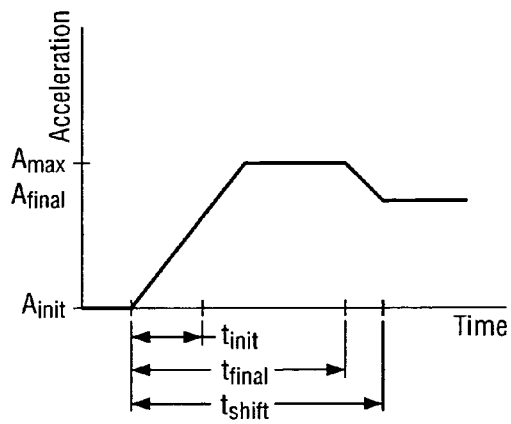
FIG. 3a is a graphical depiction of turbine acceleration vs. time during an optimal downshift.
Figure 3B:
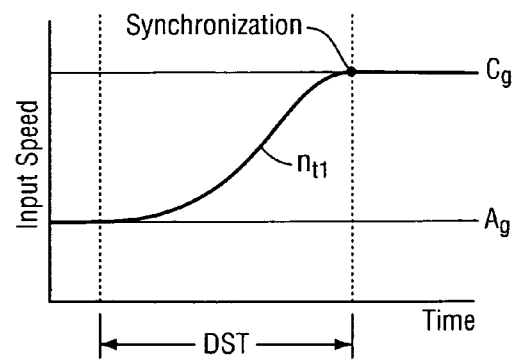
FIG. 3b is a graphical depiction of turbine speed vs. time during an optimal downshift.

The turbine acceleration profile established at step 100 is shown in FIG. 3. More precisely, FIG. 3a depicts a desired input acceleration trajectory for the inertia phase of a power-on downshift from an attained gear speed Ag to a commanded gear speed Cg, assuming a constant output acceleration during the shift, and FIG. 3b depicts a corresponding input speed profile. As seen in FIG. 3b, the input speed prior to the inertia phase is determined by the product (output speed)×Ag, whereas the input speed at the conclusion of the inertia phase is determined by the product (output speed)×Cg.

The parameters of the acceleration trajectory of Graph A include the initial acceleration $A_{init}$, the maximum acceleration $A_{max}$, the final acceleration $A_{final}$, and the times $t_{init}$, $t_{final}$, and $t_{shift}$. The terms $A_{final}$, $t_{init}$, $t_{final}$, and $t_{shift}$ are determined by calibration as a function of one or more other parameters. For example, $t_{shift}$ may be determined as a function of driver torque demand, whereas $t_{init}$ and $t_{final}$ may be predetermined percentages of $t_{shift}$. The value of $A_{final}$ is a calibrated value selected to achieve smooth shift completion. $A_{init}$ is the turbine speed measured prior to a shift event. $A_{max}$ is computed based on the acceleration trajectory parameters and speed difference across the on-coming clutch, referred to herein as the slip speed.

The calculations performed in step 102 of FIG. 2a start with the following two basic equations:

$$\dot{n}_i = a_i T_i + b_i T_{cf} + c_i T_o$$

$$\dot{n}_o = a_o T_i + b_o T_{cf} + c_o T_o$$

The calibration constants $a_i$, $b_i$, $c_i$, $a_o$, $b_o$, and $c_o$ are derived by performing a torque analysis of the transmission to which the method of the present invention are being applied. More precisely, the torque analysis includes summing the forces at the input and output of each component of the transmission. As an example, FIG. 4 shows a free body diagram of an arbitrary transmission for which the calibration constants will be derived.

Figure 4:
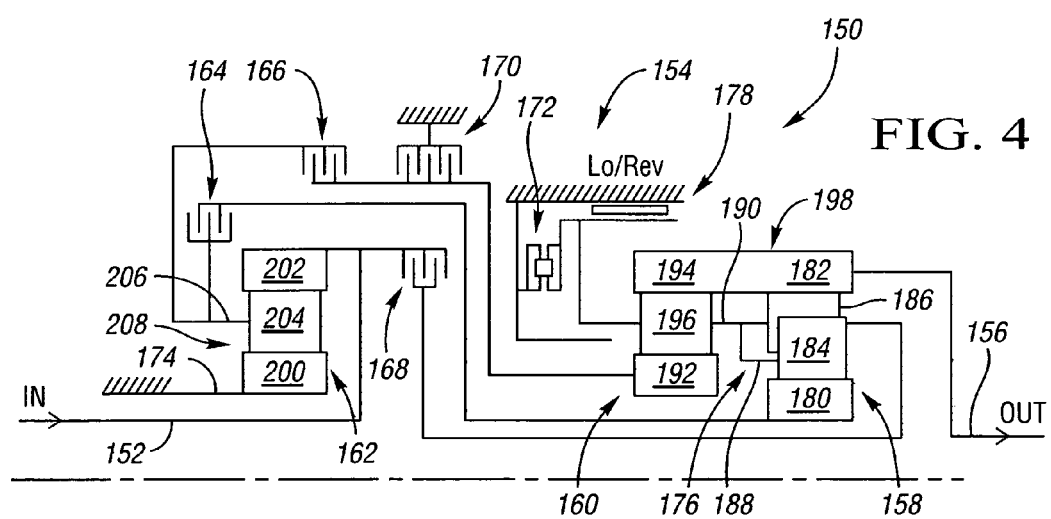
FIG. 4 is a schematic illustration of an automatic transmission.

FIG. 4 shows a six-speed planetary transmission 150. Transmission 150 is shown to illustrate a method of the invention, and it should be appreciated that the method of the present invention applies to any transmission configuration. The transmission 150 includes an input shaft 152 connected directly with an engine (not shown), a multi-speed planetary gear arrangement 154, and an output shaft 156 connected directly with final drive mechanism (not shown). Planetary gear arrangement 154 includes a compound planetary gearset 158, two simple planetary gearsets 160 and 162, three selectively engageable rotating torque transmitting mechanisms 164, 166 and 168 and a selectively engageable stationary torque transmitting mechanism 170. In a preferred embodiment, the planetary gear arrangement 154 includes a 1–2 overrunning clutch "OWC" 172 installed between stationary housing 174 and common carrier assembly 176, and a modified low/reverse starting clutch 178.

The first planetary gearset 158 is shown to include a sun gear 180, a ring gear 182, and a planet carrier assembly 176. Meshed pairs of pinion gears 184 and 186 are rotatably supported on pinion shafts 188 and 190, respectively, that extend between laterally-spaced carrier segments of carrier assembly 176. Pinion gears 184 mesh with sun gear 180 while pinion gears 186 mesh with ring gear 182.

The second planetary gearset 160 includes a sun gear 192, a ring gear 194, and a plurality of pinion gears 196 that are meshed with both sun gear 192 and ring gear 194. As seen, pinion gears 196 are rotatably supported on pinion shafts 188 that also extend between the laterally-spaced carrier segments of carrier assembly 176. Thus, carrier assembly 176 is common to both first planetary gearset 158 and second planetary gearset 160. A ring gear assembly 198 is defined by ring gear 182 of first gearset 158 and ring gear 194 of second planetary gearset 160 being connected together to rotate as a unitary component. Third planetary gearset 168 is shown to include a sun gear 200, a ring gear 202, and pinion gears 204 in meshed engagement with both sun gear 200 and ring gear 202. Pinion gears 204 are rotatably supported on shafts 206 extending between components of a carrier assembly 208. In addition, sun gear 200 is shown to be held stationary due to its direct connection to a stationary housing portion 174 of transmission 150.

The calibration constants $a_i$, $b_i$, $c_i$, $a_o$, $b_o$, and $c_o$ can be solved for the transmission of FIG. 4 using Newton's second law for rotational dynamics and summing the forces at the input and output of each component. The equations derived in this manner from the transmission of FIG. 4 are as follows:

$$I_{202} * \dot{\omega}_{202} = -T_{202} + (T_i + T_{168})$$

$$I_{200} * \dot{\omega}_{200} = T_{200} - T_{ground}$$

$$I_{208} * \dot{\omega}_{208} = T_{202} - T_{200} - T_{164} - T_{166}$$

$$I_{204} * \dot{\omega}_{204} = \frac{T_{202}}{N_{202}}\left(\frac{N_{202} - N_{200}}{2}\right) + \frac{T_{200}}{N_{200}}\left(\frac{N_{202} - N_{200}}{2}\right)$$

$$N_{200} * \dot{\omega}_{200} = \dot{\omega}_{208}\left(\frac{N_{202} + N_{200}}{2}\right) - \dot{\omega}_{204}\left(\frac{N_{202} - N_{200}}{2}\right)$$

$$N_{202} * \dot{\omega}_{202} = \dot{\omega}_{208}\left(\frac{N_{202} + S_{200}}{2}\right) + \dot{\omega}_{204}\left(\frac{N_{202} - N_{200}}{2}\right)$$

$$I_{180} * \dot{\omega}_{180} = -T_{180} + T_{164}$$

$$I_{176} * \dot{\omega}_{176} = T_{180} - T_{182} - T_{192} - T_{178} - T_{172} + T_{168}$$

$$I_{180} * \dot{\omega}_{180} = -T_{180} + T_{164}$$

$$I_{192} * \dot{\omega}_{192} = T_{192} + T_{166} - T_{170}$$

$$I_{182} * \dot{\omega}_{182} = T_{182} - T_{156}$$

$$I_{184} * \dot{\omega}_{184} = N_{184} F_{184} - T_{180}\left(\frac{N_{184}}{N_{180}}\right)$$

$$I_{196} * \dot{\omega}_{196} =$$
$$-\frac{T_{182}}{N_{182}}\left(\frac{N_{182} - N_{192}}{2}\right) + \frac{T_{192}}{N_{192}}\left(\frac{N_{182} - N_{192}}{2}\right) + F_{184}\left(\frac{N_{182} - N_{190}}{2}\right)$$

$$N_{192} * \dot{\omega}_{192} = \dot{\omega}_{176}(N_{182} + N_{192}) - \dot{\omega}_{182} N_{182}$$

$$N_{182} * \dot{\omega}_{182} = N_{180} * \dot{\omega}_{180} + \dot{\omega}_{a1}(N_{182} - N_{180})$$

$$N_{182} * \dot{\omega}_{182} = \dot{\omega}_{196}\left(\frac{N_{182} - N_{192}}{2}\right) + N_{182} * \dot{\omega}_{176}$$

$$N_{184} * \dot{\omega}_{184} = \dot{\omega}_{186}\left(\frac{N_{182} - N_{192}}{2}\right)$$

$$\dot{\omega}_{208} = \dot{\omega}_{180}$$

Where T is a torque value, I is inertia, F is force, ω is rotational velocity, $\dot{\omega}$ is rotational acceleration and N is the number of teeth on a particular gear element. $\dot{n}$ and $\dot{\omega}$ are both rotational acceleration values but are differentiated in that $\dot{n}$ is measured in rpm/second² whereas $\dot{\omega}$ is measured in radians/second².

Having solved for the calibration constants associated with a particular transmission, corresponding values for $\dot{n}_i$ and $\dot{n}_o$ are calculated from the two basic equations provided hereinabove. At step 102 of FIG. 2a, the values of $\dot{n}_i$ and $\dot{n}_o$ are then input into the following equation to solve for To_Blend.

$$T_o\_Blend = \frac{\dot{n}_t - (a_t - b_t a_o/b_o)T_i}{(b_t/b_o(\dot{n}_o/T_o)_i - b_t c_o/b_o + c_t)}$$

As the value of $\dot{n}$ derived from the free body diagram of the transmission was based on the desired shift time, the corresponding value of To_Blend is similarly scaled to meet the desired shift time.

At step 102 of FIG. 2*a*, the value of To_Blend scaled to meet desired shift time is then input into the following equation to solve for Tcl_Blend, which is thereby also scaled to follow both the desired shift time and the scaled output torque.

$$T_{cl}\_Blend = \frac{\{[(\dot{n}_o/T_o)_i + a_o c_t/a_t - c_o]T_o - a_o/a_t * \dot{n}_t\}}{(b_o - a_o b_t/a_t)}$$

At step 104 of FIG. 2*a*, a limited value of output torque To_Clamp is recalculated with the limited value of clutch torque Tcl according to the equation:

$$T_o\_Clamp = \frac{[T_{cl}(b_o - a_o b_t/a_t) + a_o/a_t * \dot{n}_t]}{[(\dot{n}_o/T_o)_i + a_o c_t/a_{t-} c_o]}$$

The recalculated value of output torque $T_o\_$Clamp and the limited value of clutch torque $T_{cl\_}$Blend are input into the following equation to derive a base input torque $T_{i\_}$Clamp required to achieve the desired shift time.

$$T_i\_Clamp = \frac{\dot{n}_t - b_t T_{cl} + c_t T_o}{a_t}$$

This value of input torque is limited to levels that the engine can produce, which thereby may necessitate modification of the desired shift time. As indicated hereinabove, this equation is applicable to all power-on downshifts. The equation for Ti_Clamp as it applies to power-on skip through neutral downshifts may be obtained by incorporating the assumptions identified hereinabove. Therefore, assuming there is zero output torque and zero off-going clutch torque during the inertia phase of a power-on skip through neutral down shift, the equation for $T_{i\_}$Clamp becomes $T_{i\_}$Clamp= $\dot{n}_t/a_t$. The value of $T_{i\_}$Clamp may be calculated in this manner and represents the optimal transmission input torque that meets the desired shift time. Engine output may then be altered by an amount necessary to change the actual value of the transmission input torque to the calculated optimal value of transmission input torque. In a preferred embodiment, a reduction of engine torque is accomplished by spark arrest and an increase of engine torque is accomplished by opening the throttle. It should be appreciated, however, that there are numerous methods for increasing and/or decreasing transmission input torque and that the present invention is not limited to applications incorporating engines but may be implemented in conjunction with any number of additional power sources as well.

FIG. 2*b* illustrates a method for calculating an optimal value for transmission input torque during the torque phase of the ratio change. FIG. 2*b* is distinguishable from FIG. 2*a* in part because FIG. 2*a* is implemented during the inertia phase and FIG. 2*b* is implemented during the torque phase of a shift event.

The method of FIG. 2*b* initially involves deriving a series of equations drawn to the more general power-on downshift disclosed in the incorporated patent application Ser. No. 10/972,067. The derived equations are thereafter solved by assuming that off-going clutch torque is zero during the torque phase of a power-on skip through neutral downshift.

As with the steps 102–104 of FIG. 2*a*, the following steps 112–120 will initially be described without applying the assumption for power-on skip through neutral downshifts to explain the derivation of the equations, and thereafter the resultant equations will be solved using this assumption. At step 112 of FIG. 2*b*, the off-going clutch torque $T_{cl}$ calculated according to the method of FIG. 2*a* is ramped to zero over the duration of the torque phase time to produce a ramped off-going clutch torque $T_{off}$. At step 114, which is performed generally simultaneously with step 112, on-coming clutch torque $T_{oncl}$ is ramped from a calibration threshold to a value representing the holding torque for the next gear ratio over the duration of the torque phase time. The ramped on-coming clutch torque derived at step 114 is identified by reference character $T_{on}$. At step 116, the torque phase input torque $T_i$ is calculated. Also at step 116, the recalculated torque phase input torque Ti (Desired) is adjusted by a multiplication factor representative of the torque converter and sent to the engine control module 107.

At step 116 of FIG. 2*b*, the following two equations are used to calculate the torque phase input torque $T_i$:

$$T_{on} = k_{61}T_o + k_{62}T_i + k_{63}\dot{n}_t$$

$$T_{off} = k_{64}T_o + k_{65}T_i + k_{66}\dot{n}_t$$

The values $k_{61}$, $k_{62}$, $k_{63}$, $k_{64}$, $k_{65}$ and $k_{66}$ are calibration constants which are solved for a particular transmission in a manner similar to that described hereinabove for the calibration constants $a_t$, $b_t$, $c_t$, $a_o$, $b_o$, and $c_o$. Input torque is then solved for using the equation:

$$T_i = \frac{-(k_{61}/k_{64} * T_{off} - T_{on} - k_{66}k_{61}/k_{64} * \dot{n}_t + k_{63} * \dot{n}_t)}{(-k_{61}k_{65}/k_{64} + k_{62})}$$

As indicated hereinabove, this equation is applicable to all power-on downshifts. The equation for $T_i$ as it applies to the torque phase of a power-on skip through neutral downshift may be obtained by incorporating the assumptions identified hereinabove. Therefore, assuming there is zero off-going clutch torque during the torque phase of a power-on skip through neutral down shift, the equation for $T_i$ becomes:

$$T_i = \frac{-(-T_{on} - k_{66}k_{61}/k_{64} * \dot{n}_t + k_{63} * \dot{n}_t)}{(-k_{61}k_{65}/k_{64} + k_{62})}$$

The value of $T_i$ may be calculated in this manner and represents the optimal transmission input torque required to hold synchronization with minimal on-coming clutch torque. Engine output may then be altered by an amount necessary to change the actual value of the transmission input torque to the calculated optimal value of transmission input torque using known physical characteristics of a torque converter such as, for example, converter torque ratio.

Another aspect of the present invention provides a method for optimally timing the two off-going and two on-coming clutches. To initiate a power-on skip through neutral downshift according to the method of the present invention both off-going clutches are simultaneously released. The release of the off-going clutches may be delayed by an amount calculated to meet the desired shift time as will be described in detail hereinafter. The engagement of a primary on-coming clutch is delayed by an amount calculated to maintain zero primary on-coming capacity until the point of synchronization and immediately thereafter generate positive torque. The engagement of a secondary on-coming clutch is similarly delayed by an amount calculated to reach full or nearly full capacity before the point of synchronization. Tie-up, a condition wherein the secondary on-coming clutch gains capacity before the off-going clutches are completely released, is prevented in the calculation of the desired shift time. More precisely, a desired shift time is selected that is long enough to prevent tie-up by providing adequate time to completely release the off-going clutches, and thereafter engage the secondary on-coming clutch such that it reaches full capacity prior to synchronization and within the desired shift time.

To calculate the off-going and on-coming clutch delay periods, the method of the present invention establishes an off-going delay adaptive parameter, a primary volume adaptive parameter and a secondary volume adaptive parameter (learned from a previous power-on downshift as described in detail hereinafter). The off-going delay adaptive parameter is an estimated value representing the expected amount of time between the commanded release of the two off-going clutches and slip. Slip, as will be described in detail hereinafter, is the point at which the turbine speed exceeds the attained gear speed to initiate the ratio change. The primary volume adaptive parameter and the secondary volume adaptive parameter are estimated values representing the volumes of the primary and secondary on-coming clutch apply chambers, respectively. The off-going delay and primary on-coming volume adaptive parameters are variable and may be adapted or corrected according to a method of the present invention to more accurately represent their respective estimated value when additional information becomes available and as described in detail hereinafter. The secondary on-coming volume adaptive parameter is learned from a previous power-on down shift that does not skip through neutral (has single off-going and on-coming clutches) and that includes the same clutch. For example, in a 6-3 power-on skip through neutral downshift the secondary on-coming clutch C1 may be learned from a previous 5-4 power-on downshift. It should be appreciated that the off-going delay is proportional to input torque and may be adapted in a manner reflecting this relationship such as, for example, with a multi-place adaptive parameter.

The primary and secondary volume adaptive parameters may be converted to an estimate of the time required to fill the respective apply chambers based on a full-feed fill rate. An estimate of the time required to completely engage the secondary on-coming clutch can be calculated by adding the time required to fill the secondary on-coming apply chamber to a compliant element calibration. The compliant element calibration represents the minimum time required for the secondary on-coming clutch to reach full capacity after the apply chamber is full. Therefore, the minimum time required to perform a power-on skip through neutral downshift according to the method of the present invention may be defined by the off-going delay plus the greater of the two estimated values respectively representing the time required for the secondary on-coming clutch to reach full capacity, and the time required to completely fill the primary on-coming apply chamber.

If the desired shift time is long enough to allow the secondary on-coming clutch to reach full capacity prior to synchronization, and the desired shift time is also long enough to allow the primary on-coming apply chamber to be completely filled prior to synchronization, the timing of the clutch elements proceeds as follows. The power-on skip through neutral downshift is initiated by immediately releasing both off-going clutches. Actuation of the secondary on-coming clutch is delayed by an amount calculated to ensure full capacity prior to synchronization. Actuation of the primary on-coming clutch is delayed by an amount calculated to fill the primary on-coming apply chamber without generating any torque precisely at the point of synchronization such that immediately thereafter positive torque is generated.

If the desired shift time is long enough to allow the secondary on-coming clutch to reach full capacity prior to synchronization, but the desired shift time is not long enough to allow the primary on-coming apply chamber to be completely filled prior to synchronization, the timing of the clutch elements proceeds as follows. The control unit 66 (shown in FIG. 1) begins filling the primary on-coming clutch apply chamber before the off-going clutches are released such that the primary on-coming apply chamber is completely filled precisely at the point of synchronization. Thereafter, the release of both off-going clutches is delayed by an amount adapted to meet the desired shift time. After the off-going clutches have been released, actuation of the secondary on-coming clutch is delayed by an amount calculated to ensure full capacity prior to synchronization.

If the desired shift time is long enough to allow the primary on-coming apply chamber to be completely filled prior to synchronization, but the desired shift time is not long enough to allow the secondary on-coming clutch to reach full capacity prior to synchronization, the timing of the clutch elements proceeds as follows. The control unit 66 (shown in FIG. 1) begins filling the secondary on-coming clutch apply chamber before the off-going clutches are released such that full capacity of the secondary on-coming clutch is reached prior to synchronization. Thereafter, the release of both off-going clutches is delayed by an amount adapted to meet the desired shift time. Actuation of the primary on-coming clutch is delayed by an amount calculated to fill the primary on-coming apply chamber without generating any torque precisely at the point of synchronization such that immediately thereafter positive torque is generated.

If the desired shift time is not long enough to allow the secondary on-coming clutch to reach full capacity prior to synchronization, and the desired shift time is also not long enough to allow the primary on-coming apply chamber to be completely filled prior to synchronization, the timing of the clutch elements proceeds as follows. The control unit 66 (shown in FIG. 1) begins filling the primary and secondary on-coming clutch apply chambers before the off-going clutches are released such that full capacity of the secondary on-coming clutch is reached prior to synchronization and the primary on-coming apply chamber is completely filled precisely at the point of synchronization. Thereafter, the release of both off-going clutches is delayed by an amount adapted to meet the desired shift time.

Referring again to FIG. 3b, a predefined optimal power-on skip through neutral downshift is shown. More precisely, FIG. 3b shows an optimal torque converter turbine speed $n_{t1}$ transitioning from the attained gear speed Ag to the commanded gear speed Cg. Those skilled in the art will recognize that the turbine and input shaft are interconnected, and, accordingly, the turbine speed is the same as the input shaft speed. Those skilled in the art will also recognize that the attained gear speed Ag is the transmission output speed multiplied by the currently selected gear ratio, whereas the commanded gear speed Cg is the transmission output speed multiplied by the commanded gear ratio. For example, during a power-on skip through neutral 6-3 downshift, Ag is transmission output speed multiplied by the sixth gear ratio and Cg is the transmission output speed multiplied by the third gear ratio.

Figure 5:
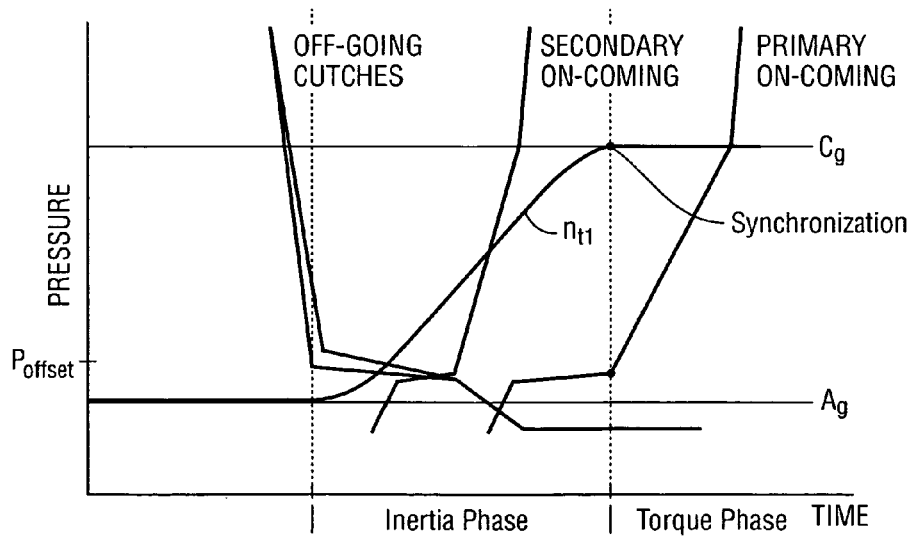
FIG. 5 is a graphical depiction of clutch pressure vs. time during the optimal downshift of FIG. 3b.

FIG. 5 shows off-going and on-coming clutch pressures superimposed on the optimal torque converter turbine speed of FIG. 3b. As shown in FIG. 5b, the ratio change is initiated when both off-going clutches are released such that the turbine speed $n_{t1}$ slips from the attained gear speed Ag thereby starting the inertia phase of the shift. The secondary on-coming clutch gains capacity after the off-going clutches have been released, and is at full or nearly full capacity prior to synchronization. The primary on-coming clutch pressure reaches the offset pressure $P_{offset}$ at the point of synchronization, and increases thereafter generating positive on-coming clutch torque. The offset pressure $P_{offset}$ represents the pressure applied by the primary on-coming clutch return spring (not shown). Immediately after the point of synchronization, the primary on-coming clutch is generating some torque but generally not enough to prevent a past-synchronization condition, hereinafter called engine flare, wherein the turbine speed $n_t$ exceeds the commanded gear speed Cg. The method of the present invention therefore implements engine torque management as described hereinabove with reference to FIG. 2b to prevent engine flare.

In addition to the adaptive parameters identified hereinabove, including the off-going delay; primary on-coming volume; and secondary oncoming volume, the method of the present invention also establishes an engine torque adaptive parameter. The engine torque adaptive parameter represents the correction or adjustment to the calculated value of transmission input torque derived hereinabove. The adaptive parameters are variable and may be corrected in response to shift aberrations, or deviations from the predefined optimal shift of FIG. 5a, which indicate that one or more of the parameters are inaccurate. The adaptive parameters of the present invention will be described as single element adaptive parameters, however it should be appreciated that the adaptive parameters may include multiple elements as described in the incorporated patent application Ser. No. 10/972,067.

Figure 6A:
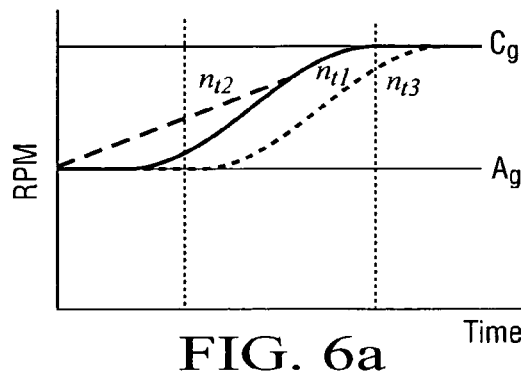
FIG. 6a is a graphical depiction of turbine speed during the shift aberrations "slip early" and "slip late"

The shift aberrations that are correctable by adjusting one or more adaptive parameter are graphically represented in FIGS. 6a–d. In FIG. 6a, turbine speed $n_{t2}$ represents the shift aberrations "slip early" and turbine speed $n_{t3}$ represents the shift aberration "slip late." The slip early and slip late aberrations may be corrected by adjusting the off-going delay adaptive parameter. More precisely, the off-going delay adaptive parameter may be increased if slip is detected later than expected, and the off-going delay adaptive parameter may be decreased if slip is detected earlier than expected.

Deviation of turbine speed $T_s$ from attained gear speed $A_g$ is monitored by the control unit to determine the occurrence of slip early or slip late. If turbine speed $n_t$ prematurely rises more than a predetermined amount, e.g., 50 rpm, above attained gear speed $A_g$, slip early is indicated. Conversely, if turbine speed nt is delayed in rising more than a predetermined amount, e.g., 50 rpm, above attained gear speed $A_g$, slip late is indicated.

Figure 6B:
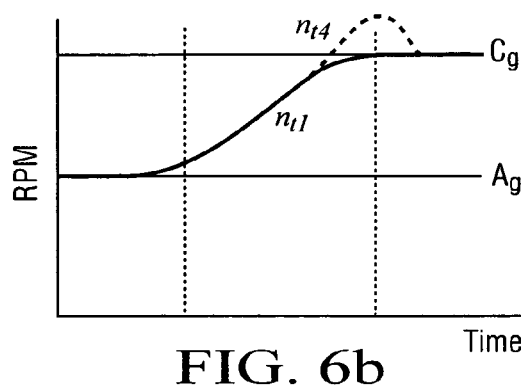
FIG. 6b is a graphical depiction of turbine speed during the shift aberration "flare"

As shown in FIG. 6b, flare is a shift aberration wherein the turbine speed $n_{t4}$ rises more than a predetermined amount, e.g., 50 rpm, above commanded gear speed $C_g$. The flare aberration may be corrected by adjusting the primary on-coming volume adaptive parameter as will be described in detail hereinafter.

Figure 6C:
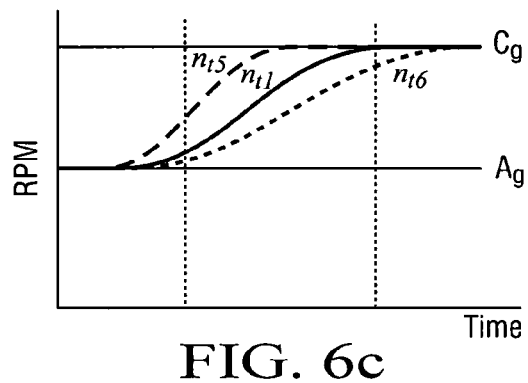
FIG. 6c is a graphical depiction of turbine speed during the shift aberrations "short shift," "long shift," "closed loop increase," and "closed loop decrease"

The turbine speed during a short shift and a long shift are graphically depicted by line $n_{t5}$ and line $n_{t6}$ of FIG. 6c, respectively, and are contrasted by the solid line representation of turbine speed $n_{t1}$ during the predefined optimal power-on skip through neutral downshift. A short shift or long shift is identified by comparing the duration of the inertia phase with a predetermined optimal shift time. The duration of the inertia phase is the period of time beginning when the turbine speed is a predetermined amount, e.g., 50 rpm, greater than the attained gear speed Ag and ending when the turbine speed is a predetermined amount, e.g., 50 rpm, less than the commanded gear speed Cg. Insufficient inertia phase duration, i.e., in comparison to the predetermined optimal shift time, is indicative of a short shift, and excessive inertia phase duration is indicative of a long shift. The short shift and long shift aberrations may be corrected by adjusting the engine torque adaptive parameter. More precisely, the engine torque adaptive parameter may be increased if a short shift is detected, and the engine torque adaptive parameter may be decreased if a long shift is detected.

Figure 6D:
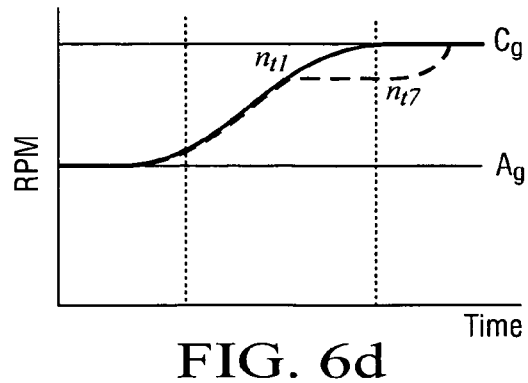
FIG. 6d is a graphical depiction of turbine speed during the shift aberration "underlap turbine float"

As shown in FIG. 6d, underlap turbine float is a shift aberration wherein the primary on-coming clutch does not have enough capacity to pull the turbine speed $n_{t7}$ up to the commanded gear speed Cg, and the turbine speed $n_{t7}$ therefore "floats" at a speed below the commanded gear speed Cg. The underlap turbine float aberration may be corrected by adjusting the primary on-coming volume adaptive parameter as will be described in detail hereinafter.

Figure 7:
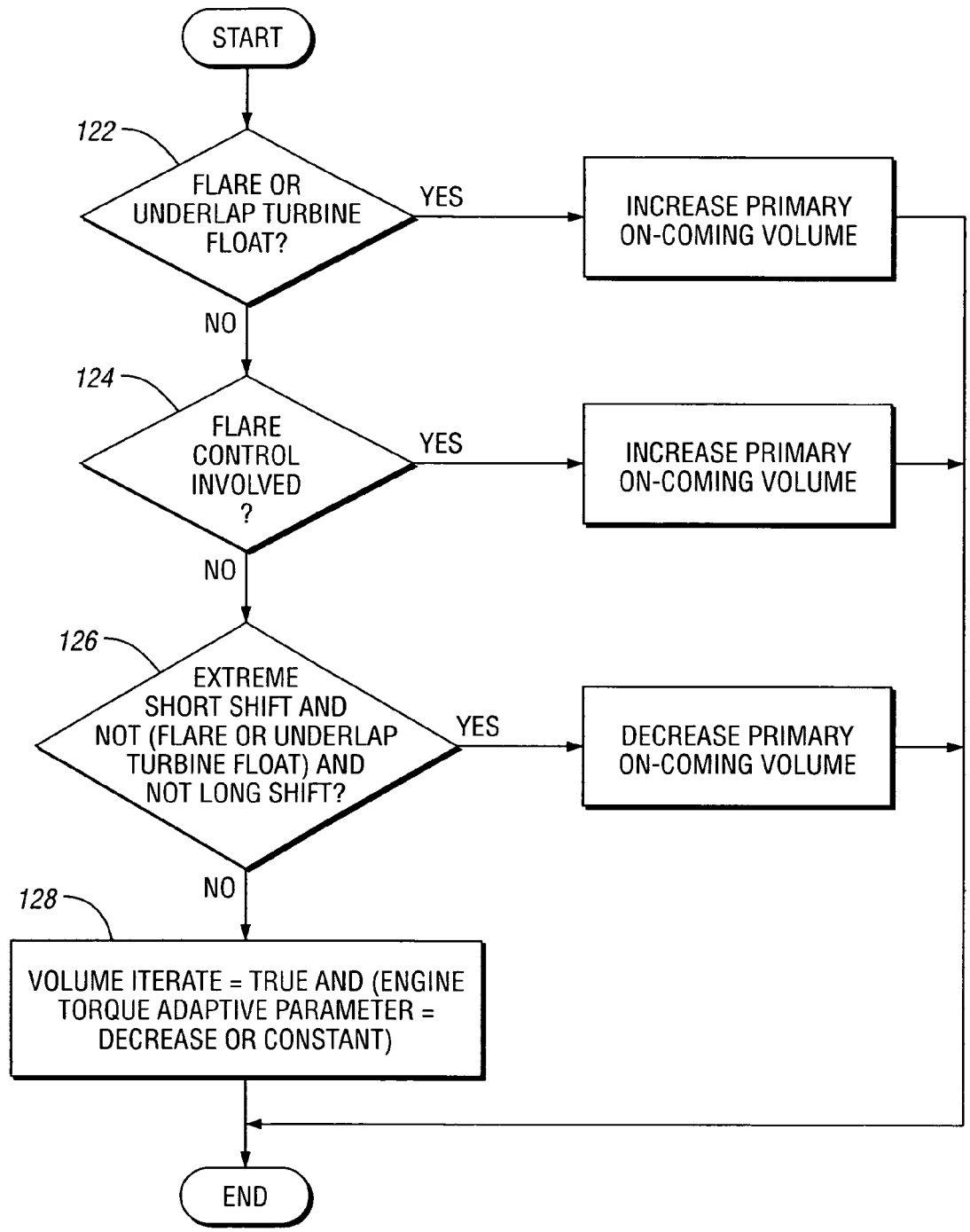
FIG. 7 is a block diagram illustrating a method of adjusting a primary on-coming volume adaptive parameter of the present invention.

A method for addressing one or more of the shift aberrations identified hereinabove by adjusting the primary on-coming volume adaptive parameter is shown in FIG. 7. At step 122, if flare or underlap turbine float is detected the primary on-coming volume adaptive parameter is increased. At step 124, if flare control is invoked the primary on-coming volume adaptive parameter is increased. For purposes of the present invention, flare control is defined as the process of reducing engine output to address flare (shown in FIG. 6b). According to a preferred embodiment, the primary on-coming volume adaptive parameter increase of steps 122 and 124 may not exceed a predefined volume limit representing the maximum primary on-coming apply chamber volume. At step 126, if there is an extreme short shift, no flare, no underlap turbine float, and no long shift aberrations the primary on-coming volume adaptive parameter is decreased. For purposes of this disclosure, an extreme short shift is a shift that is short by more than a predefined amount. At step 128, if the criteria for steps 122–126 are not met after a predefined number of shifts and the engine torque adaptive parameter is either decreased or remains constant, the primary on-coming volume adaptive parameter is incrementally decreased to produce flare. The optimal value for the primary on-coming volume adaptive parameter is that which is just enough to prevent flare. Therefore, the incremental decrease of step 128 periodically recalibrates the primary on-coming volume adaptive parameter to its optimal or nearly optimal value.

The primary on-coming volume adaptive parameter is preferably increased or decreased according to the method of FIG. 7 by a corrective value obtained by the following equation: (full correction)(scalar)(gain). Full correction is either a calibration or measured signal, such as from turbine speed, that gives a term to correct the adaptive problem. The scalar is a function of the shift aberration type, since some shift aberrations may require more aggressive corrective action than others. The gain is related to an adaptive error counter that tracks the direction the primary on-coming volume adaptive parameter is moving. If the on-coming volume adaptive parameter increases during consecutive downshifts, the adaptive error counter is increased by one each shift to a predetermined maximum value, e.g., seven. Similarly, if the off-going delay adaptive parameter decreases during consecutive downshifts, the adaptive error counter is decreased by one each shift to a predetermined minimum value, e.g., negative seven. The gain is established based on the adaptive error counter value such that the magnitude of the gain is proportional to the absolute value of the adaptive error counter. In other words, each consecutive increase or decrease in the adaptive error counter gives rise to a larger gain. In this manner the degree of adaptive correction can be increased if the on-coming volume adaptive parameter has been commanded to change in one direction, i.e., increased or decreased, during consecutive downshifts. Thus, the corrective value varies in response to the quantity of consecutive monitored downshifts in which a shift aberration occurs. If the on-coming volume adaptive parameter is increased and then subsequently decreased, or vice versa, the adaptive error counter is reset to zero and the gain becomes its minimal value. Additionally, it should be appreciated that the other adaptive parameters may be increased and decreased in a similar manner.

While the best mode for carrying out the invention has been described in detail, those familiar with the art to which this invention relates will recognize various alternative designs and embodiments for practicing the invention within the scope of the appended claims.

The invention claimed is:

1. A method for improving a downshift of a powertrain having an automatic transmission and a power source, said downshift including an inertia phase and a torque phase, said automatic transmission having a first off-going clutch; a second off-going clutch; a primary on-coming clutch; and a secondary on-coming clutch, said method comprising:
   establishing at least one adaptive parameter;
   disengaging both said first and second off-going clutches;
   engaging the secondary on-coming clutch;
   engaging the primary on-coming clutch;
   calculating an optimal inertia phase transmission input torque value;
   causing the power source to produce torque such that the optimal inertia phase transmission input torque value is substantially achieved during the inertia phase of the downshift;
   calculating an optimal torque phase transmission input torque value;
   causing the power source to produce torque such that the optimal torque phase transmission input torque value is substantially achieved during the torque phase of the downshift;
   monitoring transmission operating characteristics during the downshift to identify a predefined aberration from a predefined optimal downshift; and
   adjusting said at least one adaptive parameter in response to said at least one aberration to improve subsequent downshifts.

2. The method of claim 1, further comprising establishing a desired shift time.

3. The method of claim 2, wherein said disengaging both said first and second off-going clutches includes establishing a delay period after which the first and second off-going clutches are disengaged, wherein said delay period is sufficient to enable completion of the downshift during the desired shift time.

4. The method of claim 2, wherein said engaging the secondary on-coming clutch includes establishing a delay period after which the secondary on-coming clutch is engaged, wherein said delay period is sufficient to cause the secondary on-coming clutch to reach full capacity prior to the end of the inertia phase.

5. The method of claim 2, wherein said engaging the primary on-coming clutch includes establishing a delay period after which the primary on-coming clutch is engaged, wherein said delay period is sufficient to cause the primary on-coming clutch to maintain zero capacity until the end of the inertia phase.

6. The method of claim 1, wherein said establishing at least one adaptive parameter includes establishing an input torque adaptive parameter.

7. The method of claim 1, wherein said establishing at least one adaptive parameter includes establishing an off-going delay adaptive parameter.

8. The method of claim 1, wherein said establishing at least one adaptive parameter includes establishing a primary on-coming volume adaptive parameter.

9. The method of claim 1, wherein said calculating an optimal torque phase transmission input torque value includes performing a torque analysis of said transmission.

10. The method of claim 1, wherein said calculating an optimal inertia phase transmission input torque value includes performing a torque analysis of said transmission.

11. The method of claim 1, wherein said causing the power source to produce torque includes adjusting spark timing of said power source.

12. The method of claim 1, wherein said causing the power source to produce torque includes altering fuel consumption of said power source.

13. The method of claim 1, wherein said causing the power source to produce torque includes altering air intake of said power source.

14. A method for improving a downshift of a powertrain having an automatic transmission and a power source, said downshift including an inertia phase and a torque phase, said automatic transmission having a first off-going clutch; a second off-going clutch; a primary on-coming clutch; and a secondary on-coming clutch, said method comprising:
   establishing a desired shift time;
   establishing at least one adaptive parameter;
   disengaging both said first and second off-going clutches at a time calculated to enable completion of the downshift during the desired shift time;
   engaging the secondary on-coming clutch at a time calculated to enable the secondary on-coming clutch to reach full capacity prior to the end of the inertia phase;
   engaging the primary on-coming clutch at a time calculated to enable the primary on-coming clutch to maintain zero capacity until the end of the inertia phase;
   calculating an optimal inertia phase transmission input torque value;

causing the power source to produce torque such that the optimal inertia phase transmission input torque value is substantially achieved during the inertia phase of the downshift;

calculating an optimal torque phase transmission input torque value;

causing the power source to produce torque such that the optimal torque phase transmission input torque value is substantially achieved during the torque phase of the downshift;

monitoring transmission operating characteristics during the downshift to identify at least one predefined aberration from a predefined optimal downshift; and adjusting said at least one adaptive parameter in response to said at least one aberration to improve subsequent power-on skip through neutral downshifts.

15. The method of claim 14, wherein said establishing at least one adaptive parameter includes establishing an input torque adaptive parameter.

16. The method of claim 14, wherein said establishing at least one adaptive parameter includes establishing an off-going delay adaptive parameter.

17. The method of claim 14, wherein said establishing at least one adaptive parameter includes establishing a primary on-coming volume adaptive parameter.

18. A control apparatus for a powertrain having a power source and an automatic transmission, said automatic transmission having a plurality of on-coming clutches and a plurality of off-going clutches; each of said plurality of on-coming and off-going clutches having an apply chamber to which hydraulic fluid is supplied for hydraulic actuation; a plurality of actuators each configured to selectively allow pressurized fluid into one of said plurality of on-coming and off-going clutches; wherein said plurality of on-coming and off-going clutches are configured to effect a speed ratio change during a power-on skip through neutral downshift by disengagement of said plurality of off-going clutches and engagement of said plurality of on-coming clutches, the control apparatus comprising:

a controller operatively connected to said plurality of actuators to control selective disengagement of said plurality of off-going clutches, and engagement of said plurality of on-coming clutches;

wherein said controller is programmed and configured to control output of said power source in order to cause an optimal inertia phase transmission input torque value during an inertia phase of the downshift;

wherein said controller is programmed and configured to control output of said power source in order to cause an optimal torque phase transmission input torque value during a torque phase of the downshift;

wherein said controller is programmed and configured to establish an adaptive parameter;

wherein said controller is programmed and configured to monitor transmission characteristics to identify predefined shift aberrations from a predefined optimal shift; and wherein said controller is programmed and configured to adjust the adaptive parameter in response to said shift aberrations such that said shift aberrations are corrected and subsequent downshifts are improved.

19. The apparatus of claim 18, wherein said controller is configured to generate off-going clutch pressure commands to which said plurality of off-going clutches are responsive; wherein the controller is configured to determine when to generate the off-going clutch pressure commands to effect a speed ratio change based on a desired shift time.

20. The apparatus of claim 18, wherein said controller is configured to generate on-coming clutch pressure commands to which said plurality of on-coming clutches are responsive; wherein the controller is configured to determine when to generate the on-coming clutch pressure commands to effect a speed ratio change based on an estimated on-coming clutch apply chamber volume.

21. A method for improving a downshift of a powertrain having an automatic transmission and a power source, said downshift including an inertia phase and a torque phase, said automatic transmission having an off-going clutch; a common clutch, and an on-coming clutch, said method comprising:

establishing at least one adaptive parameter;

disengaging both said off-going clutch and said common clutch;

engaging the on-coming clutch;

engaging the common clutch;

calculating an optimal inertia phase transmission input torque value;

causing the power source to produce torque such that the optimal inertia phase transmission input torque value is substantially achieved during the inertia phase of the downshift;

calculating an optimal torque phase transmission input torque value;

causing the power source to produce torque such that the optimal torque phase transmission input torque value is substantially achieved during the torque phase of the downshift;

monitoring transmission operating characteristics during the downshift to identify a predefined aberration from a predefined optimal downshift; and adjusting said at least one adaptive parameter in response to said at least one aberration to improve subsequent downshifts.

22. The method of claim 21, further comprising establishing a desired shift time.

23. The method of claim 22, wherein said disengaging both said off-going clutch and said common clutch includes establishing a delay period after which the off-going clutch and common clutch are disengaged, wherein said delay period is sufficient to enable completion of the downshift during the desired shift time.

24. The method of claim 22, wherein said engaging the on-coming clutch includes establishing a delay period after which the on-coming clutch is engaged, wherein said delay period is sufficient to cause the on-coming clutch to reach full capacity prior to the end of the inertia phase.

25. The method of claim 22, wherein said engaging the common clutch includes establishing a delay period after which the common clutch is engaged, wherein said delay period is sufficient to cause the common clutch to maintain zero capacity until the end of the inertia phase.

* * * * *